Jan. 28, 1964
A. ZUCKERMAN
3,119,371
AQUARIUM COMBINED WITH A MIRROR
IMAGE PRODUCING DEVICE
Filed Dec. 29, 1961
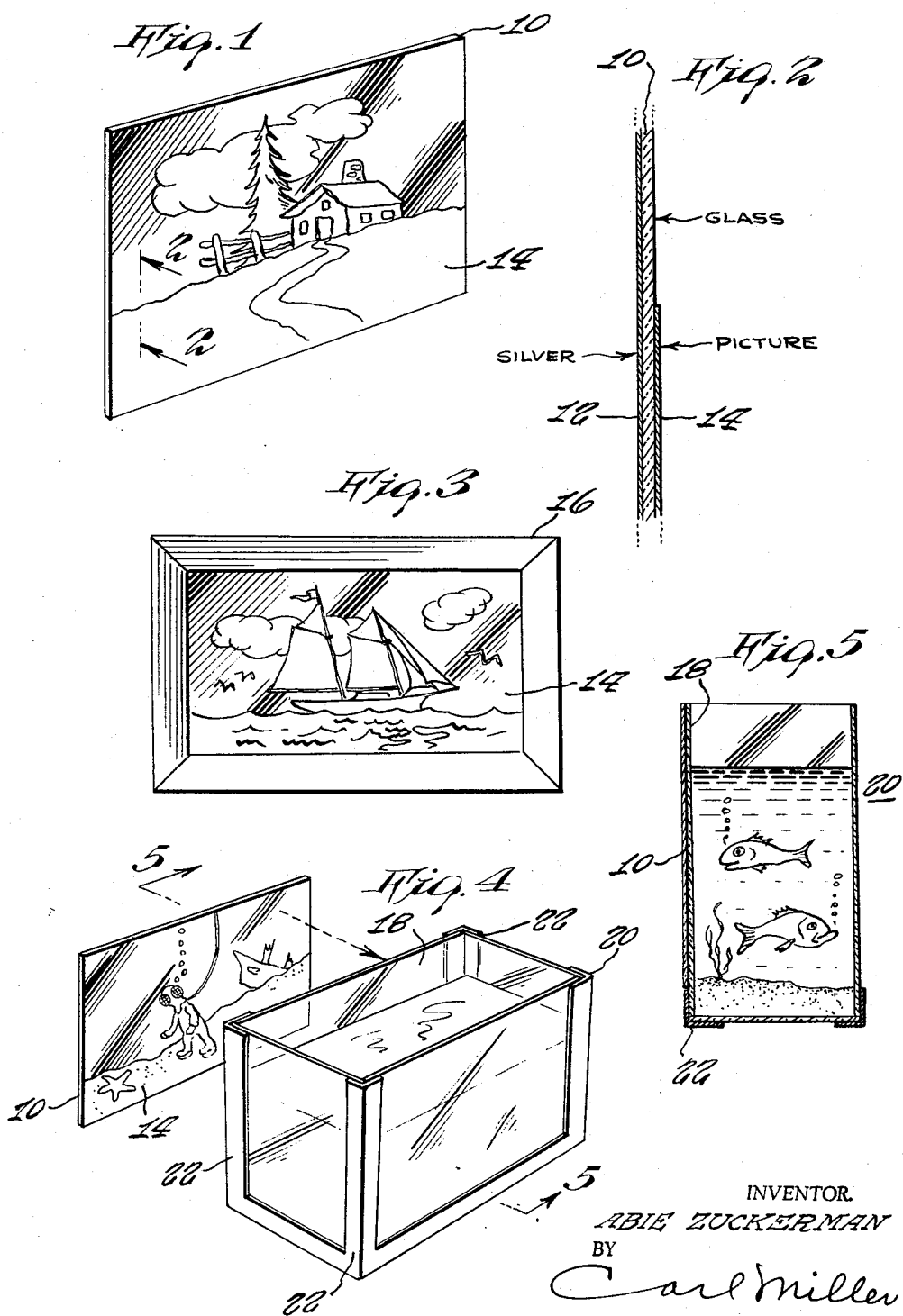
INVENTOR.
ABIE ZUCKERMAN
BY
Carl Miller
ATTORNEY

| United States Patent Office | 3,119,371 |
|---|---|
| | Patented Jan. 28, 1964 |

3,119,371
AQUARIUM COMBINED WITH A MIRROR IMAGE
PRODUCING DEVICE
Abie Zuckerman, 2705 Kings Highway,
Brooklyn 29, N.Y.
Filed Dec. 29, 1961, Ser. No. 163,231
1 Claim. (Cl. 119—5)

My invention is directed toward mirrors and more particularly is directed toward mirrors having images imprinted thereon.

It is an object of my invention to provide a new and improved mirror image producing device.

Another object of my invention is to provide a new and improved device of the character indicated which can be mounted in a picture frame and thereafter secured to a wall or similar surface to beautify and decorate the same.

Still another object of my invention is to provide a new and improved device of the character indicated which can be secured to one wall of a fish tank or aquarium as a decal type picture.

All of the foregoing and still further objects and advantages of my invention will either be explained or will become apparent from a study of the following specification, taken in conjunction with the accompanying drawings wherein:

FIGURE 1 is a perspective view of a mirror with a picture thereupon according to my invention;

FIGURE 2 is an enlarged fragmentary cross-section through line 2—2 of FIGURE 1;

FIGURE 3 shows in reduced scale the mirror of FIGURE 1 mounted in a picture frame;

FIGURE 4 shows in reduced scale the mirror of FIGURE 1 attached to one wall of a fish tank or aquarium; and FIGURE 5 is a cross sectional view drawn to an enlarged scale and taken along the line 5—5 in FIGURE 4.

Referring now to the drawings, there is shown a glass plate 10 having one surface covered with a light reflecting layer or film 12 for example a silver layer. The other surface is imprinted with an image or picture 14. (This image can be painted or imprinted mechanically or by hand in any manner shape or form; it can be screened, typographed, lithographed, engraved or photographed on the glass surface; it can be in color or in black and white; it can be use inks, paints and the like.)

If desired, plate 10 together with film 12 and image 14 can be mounted in a picture frame 16.

Alternatively, plate 10 with its associated image can be secured to one wall 18 of a fish tank or aquarium 20 whereby a three dimensional effect is produced with respect to image 14. Note that plate 10 is held in position by the same strips or sections 22 of angle iron which hold the walls and bottom of the aquarium in watertight locking position.

While my invention has been described with particular reference to the constructions shown in the drawing, it is to be understood that such is not to be construed as imparting limitations upon the invention which is best defined by the claim appended hereto.

Having thus described my invention, I claim as new and desire to secure by Letters Patent:

For use with an aquarium formed of an angle-bar frame to support the bottom and vertical side edge portions of rectangular glass sheets constituting the walls of said aquarium; a dimensional mirror inducing image device comprising a rectangular sheet of glass, a light reflecting coating applied over one surface of said sheet, an image imprinted on the opposite surface of said mirror sheet, said mirror sheet being dimensioned such as to closely fit within the side edges of the angle bar frame on one side of the aquarium with the image carrying surface of the mirror sheet in contact with the exterior surface of the rectangular glass sheet constituting said one side of the aquarium, said angle-bar frame at said one side of the aquarium surrounding the vertical and bottom sides of said mirror sheet.

References Cited in the file of this patent
UNITED STATES PATENTS

| 1,991,683 | Kelly | Feb. 19, 1935 |
| 2,144,551 | Skolnick | Jan. 17, 1939 |
| 2,221,888 | White | Nov. 19, 1940 |
| 2,879,742 | Morrill | Mar. 31, 1959 |